United States Patent
Khlat et al.

(10) Patent No.: US 7,474,708 B1
(45) Date of Patent: Jan. 6, 2009

(54) MULTIMODE TRANSMITTER ARCHITECTURE

(75) Inventors: Nadim Khlat, Cugnaux (FR); Ruediger Bauder, Otterfing (DE); Marcus Granger-Jones, Scotts Valley, CA (US)

(73) Assignee: RF Micro Devices, Inc., Greensboro, NC (US)

( * ) Notice: Subject to any disclaimer, the term of this patent is extended or adjusted under 35 U.S.C. 154(b) by 689 days.

(21) Appl. No.: 11/215,439

(22) Filed: Aug. 30, 2005

(51) Int. Cl.
*H04L 25/49* (2006.01)

(52) U.S. Cl. .................................. 375/296; 455/114.3
(58) Field of Classification Search ......... 375/295–297; 455/114.2–114.3
See application file for complete search history.

(56) References Cited

U.S. PATENT DOCUMENTS

| | | | |
|---|---|---|---|
| 6,081,158 A * | 6/2000 | Twitchell et al. ............ 330/149 |
| 6,366,177 B1 | 4/2002 | McCune et al. | |
| 6,377,784 B2 | 4/2002 | McCune | |
| 7,010,276 B2 | 3/2006 | Sander et al. | |
| 7,158,494 B2 | 1/2007 | Sander et al. | |
| 7,277,497 B2 * | 10/2007 | Hietala et al. ............... 375/302 |
| 7,359,680 B2 * | 4/2008 | Klemmer .................... 455/102 |
| 7,424,064 B2 * | 9/2008 | Shakeshaft et al. .......... 375/295 |

* cited by examiner

*Primary Examiner*—Khanh C Tran
(74) *Attorney, Agent, or Firm*—Winthrop & Terranova, P.L.L.C.

(57) ABSTRACT

A modulator for a multimode wireless transmitter is provided. In general, the modulator has three modes of operation: an Enhanced Data Rates for Global System for Mobile Communications Evolution (EDGE) mode, which may be referred to as an 8-Level Phase Shift Keying (8PSK) mode; a Gaussian Minimum Shift Keying (GMSK) mode; and a Wideband Code Division Multiple Access (WCDMA) mode.

21 Claims, 10 Drawing Sheets

MULTIMODE TRANSMITTER ARCHITECTURE

FIELD OF THE INVENTION

The present invention relates to a modulator for a multimode transmitter.

BACKGROUND OF THE INVENTION

Mobile terminals, such as mobile phones, Personal Digital Assistants (PDAs), and the like, have become ubiquitous in today's society. These mobile terminals may operate according to various wireless communications standards such as the Global System for Mobile Communications (GSM) standard, which requires a Gaussian Minimum Shift Keying (GMSK) modulation scheme for normal GSM operation and an 8-Level Phase Shift Keying (8PSK) modulation scheme for Enhanced Data Rate for GSM Evolution (EDGE) operation, and the Wideband Code Division Multiple Access (WCDMA) standard, which may also be referred to as the Universal Mobile Telecommunications System (UMTS).

Depending on geographical location, the infrastructure of the wireless communication system may change. For example, the infrastructure in a first location may support the GSM standard, and the infrastructure in a second location may support the WCDMA standard. Since it is desirable to have a mobile terminal that operates globally, a multimode mobile terminal capable of operating according to either the GSM standard or the WCDMA standard is desirable. Accordingly, there remains a need for a multimode mobile terminal capable of operating according to either the GSM standard or the WCDMA standard.

SUMMARY OF THE INVENTION

The present invention provides a modulator for a multimode wireless transmitter. In general, the modulator has three modes of operation: an Enhanced Data Rates for Global System for Mobile Communications Evolution (EDGE) mode, which may be referred to as an 8-Level Phase Shift Keying (8PSK) mode; a Gaussian Minimum Shift Keying (GMSK) mode; and a Wideband Code Division Multiple Access (WCDMA) mode.

In both the EDGE mode and the WCDMA mode, data to be transmitted is provided to polar modulation circuitry as a quadrature input signal. The polar modulation circuitry converts the quadrature input signal into amplitude and phase components. The polar modulation circuitry predistorts one or both of the amplitude and phase components in order to compensate for Amplitude Modulation to Amplitude Modulation (AM/AM) distortion, Amplitude Modulation to Phase Modulation (AM/PM) distortion, or both AM/AM and AM/PM distortion of power amplifier circuitry in the transmit chain, thereby providing predistorted amplitude and phase components.

A phase to quadrature converter converts the predistorted phase component into a quadrature phase signal. For EDGE mode, either the predistorted phase component or the quadrature phase signal is provided to further modulation circuitry, where it is modulated to provide a constant envelope phase modulated signal at a desired radio frequency.

More specifically, in a first embodiment, the quadrature phase signal is provided to a quadrature modulator when operating in EDGE mode. The quadrature modulator modulates, or upconverts, the quadrature phase signal to provide the constant envelope phase modulated signal at the desired radio frequency. In another embodiment, the predistorted phase component is converted to a frequency deviation signal. When operating in EDGE mode, the frequency deviation signal is provided to a phase-locked loop (PLL). Based on the frequency deviation signal, the PLL provides the constant envelope phase modulated signal at the desired radio frequency.

When operating in the WCDMA mode, combiner circuitry operates to combine the quadrature phase signal from the phase to quadrature converter and the predistorted amplitude component to provide a quadrature transmit signal. The quadrature transmit signal is provided to a quadrature modulator where it is modulated, or upconverted, to provide a modulated signal at a desired radio frequency. Note that, in one embodiment, the transmit path from the polar modulator to the quadrature modulator is essentially the same for both EDGE mode and WCDMA mode.

When operating in the GMSK mode, data to be transmitted is modulated by a GMSK modulator to provide a frequency deviation signal. The frequency deviation signal is provided to a PLL, which provides a phased modulated radio frequency signal at a desired radio frequency based on the frequency deviation signal.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
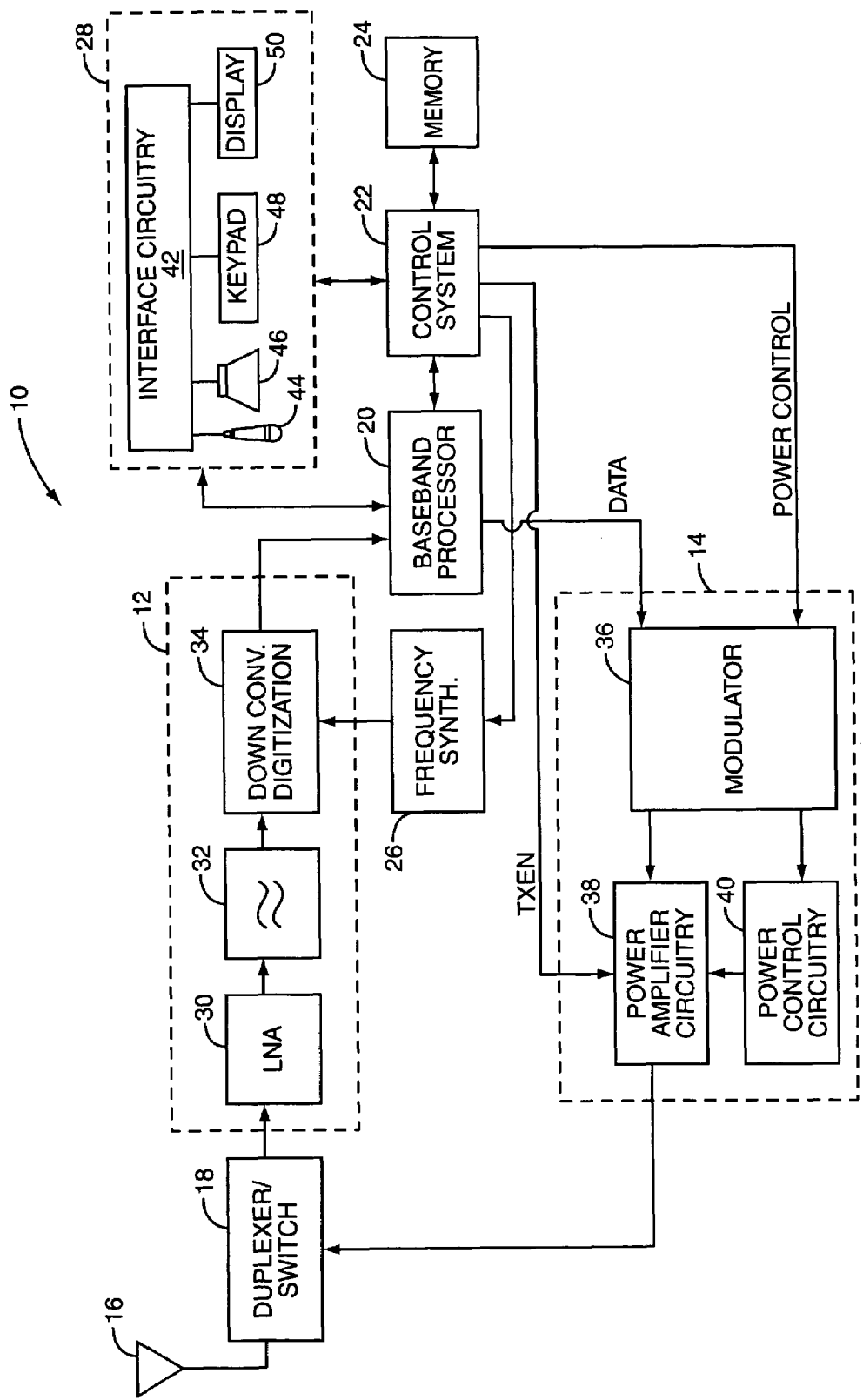
FIG. 1 illustrates a basic block diagram of an exemplary mobile terminal according to one embodiment of the present invention.

The present invention is preferably incorporated in a mobile terminal 10, such as a mobile telephone, personal digital assistant, wireless Local Area Network (LAN) device, a base station in a mobile network, or the like. The basic architecture of a mobile terminal 10 is represented in FIG. 1, and may include a receiver front end 12, a radio frequency transmitter section 14, an antenna 16, a duplexer or switch 18, a baseband processor 20, a control system 22, memory 24, a frequency synthesizer 26, and an interface 28. The receiver front end 12 receives information bearing radio frequency signals from one or more remote transmitters provided by a base station (not shown). A low noise amplifier 30 amplifies the signal. A filter circuit 32 minimizes broadband interference in the received signal, while a downconverter 34 downconverts the filtered, received signal to an intermediate or baseband frequency signal, which is then digitized into one or more digital streams. The receiver front end 12 typically uses one or more mixing frequencies generated by the frequency synthesizer 26.

The baseband processor 20 processes the digitized, received signal to extract the information or data bits conveyed in the received signal. This processing typically comprises demodulation, decoding, and error correction operations. As such, the baseband processor 20 is generally implemented in an Application Specific Integrated Circuit (ASIC) or one or more digital signal processors (DSPs).

On the transmit side, the baseband processor 20 receives digitized data from the control system 22, which it encodes for transmission. The control system 22 may run software stored in the memory 24. Alternatively, the operation of the control system 22 may be a function of sequential logic structures as is well understood. After encoding the data from the control system 22, the baseband processor 20 outputs the encoded data and power control settings (POWER CONTROL) to the radio frequency transmitter section 14.

A modulator 36 receives the data from the baseband processor 20 and operates according to one or more modulation schemes to provide a modulated signal to the power amplifier circuitry 38. As discussed below in more detail, the modulator 36 supports multimode operation. More specifically, in one embodiment, the modulator 36 operates according to either the Global System for Mobile Communications (GSM) standard or the Wideband Code Division Multiple Access (WCDMA) standard. For the GSM standard, the modulator 36 operates according to either an 8-Level Phase Shift Keying (8PSK) modulation scheme, which is a modulation scheme containing both amplitude and phase components, or a Gaussian Minimum Shift Keying (GMSK) modulation scheme, which is a constant amplitude modulation scheme. The 8PSK modulation scheme is used for Enhanced Data Rates for GSM Evolution (EDGE) operation.

For the WCDMA standard, the modulator 36 may operate according to a Quadrature Phase Shift Keying (QPSK) modulation scheme, or, alternatively, a 16-Level Quadrature Amplitude Modulation (16 QAM) modulation scheme. During WCDMA operation, the baseband processor 20 maps data from the control system 22 into in-phase (I) and quadrature phase (Q) samples at a 1× chip rate, which is 3.84 MHz. The mapping is defined by the 3rd Generation Partnership Project (3GPP) specifications, as will apparent to one having ordinary skill in the art. In general, the data is mapped by creating several channels spread with different spreading codes and combining the channels with various power gains to provide the in-phase (I) and quadrature phase (Q) samples.

In operation, the modulator 36 processes data from the baseband processor 20 to provide a radio frequency signal to the power amplifier circuitry 38. When in 8PSK mode, which is hereafter referred to as EDGE mode, the modulator 36 provides a constant envelope phase modulated signal to the power amplifier circuitry 38 and a control signal ($V_{RAMP}$) to the power control circuitry 40. In EDGE mode, the power amplifier circuitry 38 preferably operates in saturation, and the control signal ($V_{RAMP}$) is a combination of an amplitude modulation component and a ramping signal. The ramping signal is used to define a transmit burst and may be a combination of a unity gain ramping signal and a power control setting from the control system 22.

In another embodiment, there may be a high-power EDGE mode and a low-power EDGE mode. During the high-power EDGE mode, the power amplifier circuitry 38 may be biased to operate in saturation, and the constant envelope phase modulated signal is provided to the input of the power amplifier circuitry 38. The control signal ($V_{RAMP}$) is a combination of the amplitude modulation component and the ramping signal. During the low-power EDGE mode, the power amplifier circuitry 38 may be biased such that it operates linearly, and the modulator 36 may provide a phase and amplitude modulated signal to the power amplifier circuitry 38. The control signal ($V_{RAMP}$) is a ramping signal defining the transmit burst, but it does not include an amplitude modulation component. A magnitude of the control signal ($V_{RAMP}$) may be controlled based on the desired output power level in order to improve the efficiency of the power amplifier circuitry 38.

When in GMSK mode, the modulator 36 provides a phase modulated signal to the power amplifier circuitry 38, and the control signal ($V_{RAMP}$) is a combination of the unity gain ramping signal and the power control setting from the control system 22.

When in WCDMA mode, the power amplifier circuitry 38 operates linearly, and the modulator 36 receives the in-phase (I) and quadrature phase (Q) samples from the baseband processor 20 and provides a modulated signal to the power amplifier circuitry 38. The control signal ($V_{RAMP}$) is a power control setting either passed through the modulator 36 to the power control circuitry 40 or provided directly to the power control circuitry 40 from the control system 22. When in WCDMA mode, the control signal ($V_{RAMP}$) is used to set the supply voltage provided to the power amplifier circuitry 38 and may be controlled to improve the efficiency of the power amplifier circuitry 38 rather than to control output power. Thus, during WCDMA operation, the control signal ($V_{RAMP}$) is a constant value for a particular output power level. Further, the control signal ($V_{RAMP}$) may be reduced as the output power level is reduced to improve the efficiency of the power amplifier circuitry 38. Output power is controlled by controlling the magnitude of the modulated signal provided to the power amplifier circuitry 38, as discussed below.

The power control circuitry 40 controls supply voltage, which may also be referred to as a collector or drain voltage, provided to the power amplifier circuitry 38 based on the control signal ($V_{RAMP}$). In EDGE mode and GMSK mode, the power control circuitry 40 controls a gain, and thus an output power, of the power amplifier circuitry 38 based on the control signal ($V_{RAMP}$). In WCDMA mode, the power control circuitry 40 controls the supply voltage based on the control signal ($V_{RAMP}$), which may be varied depending on the output power level to improve the efficiency of the power amplifier circuitry 38. Based on the supply voltage provided by the power control circuitry 40, the power amplifier circuitry 38 amplifies the modulated signal from the modulator 36 to a level appropriate for transmission from the antenna 16.

A user may interact with the mobile terminal 10 via the interface 28, which may include interface circuitry 42 associated with a microphone 44, a speaker 46, a keypad 48, and a display 50. The interface circuitry 42 typically includes analog-to-digital converters, digital-to-analog converters, amplifiers, and the like. Additionally, it may include a voice encoder/decoder, in which case it may communicate directly with the baseband processor 20.

The microphone 44 will typically convert audio input, such as the user's voice, into an electrical signal, which is then digitized and passed directly or indirectly to the baseband processor 20. Audio information encoded in the received signal is recovered by the baseband processor 20, and converted into an analog signal suitable for driving speaker 46 by the interface circuitry 42. The keypad 48 and display 50 enable the user to interact with the mobile terminal 10, input numbers to be dialed and address book information, or the like, as well as monitor call progress information.

Figure 2A:
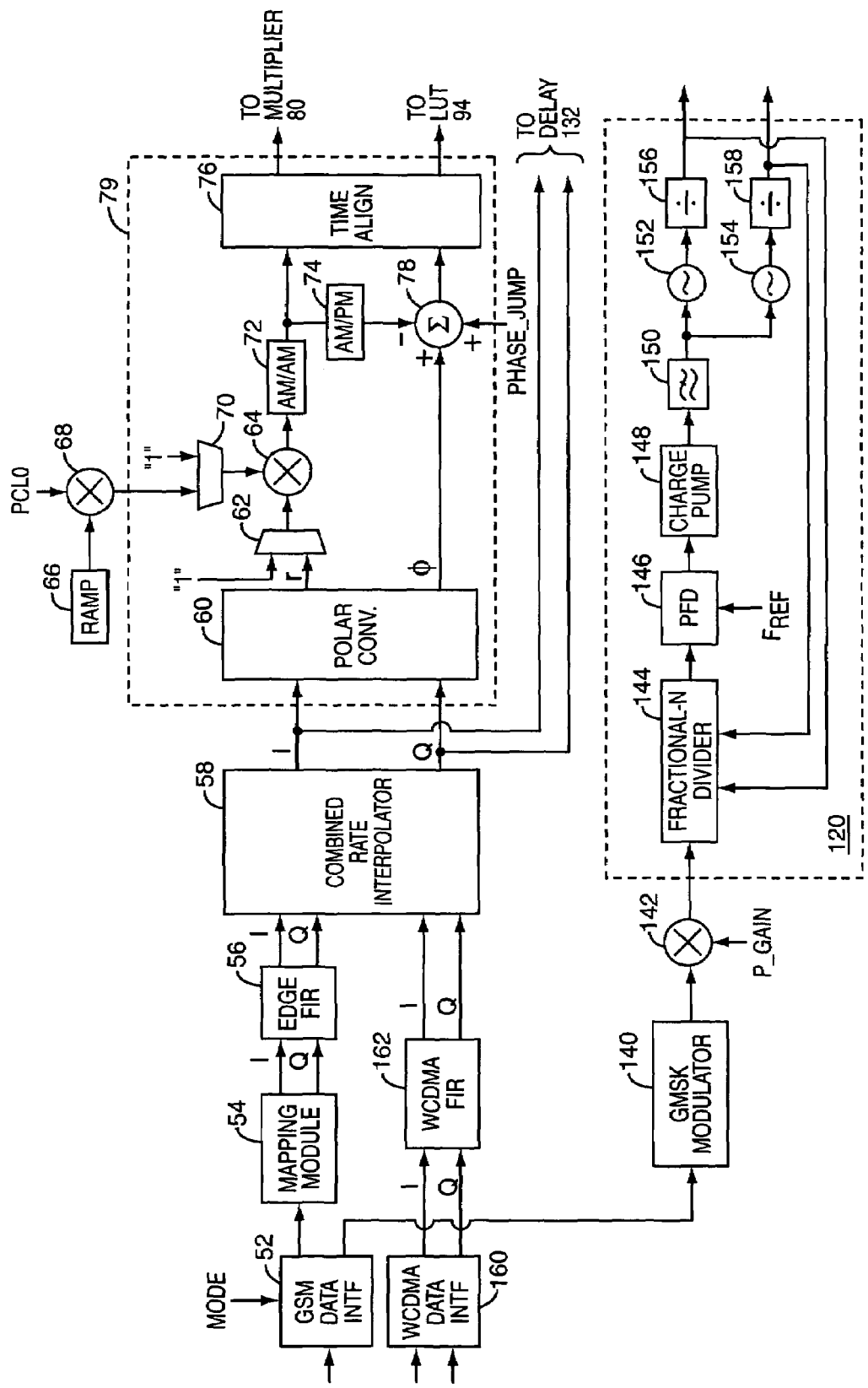
FIGS. 2A-2C illustrate a multimode modulator according to first embodiment of the present invention.
Figure 2B:
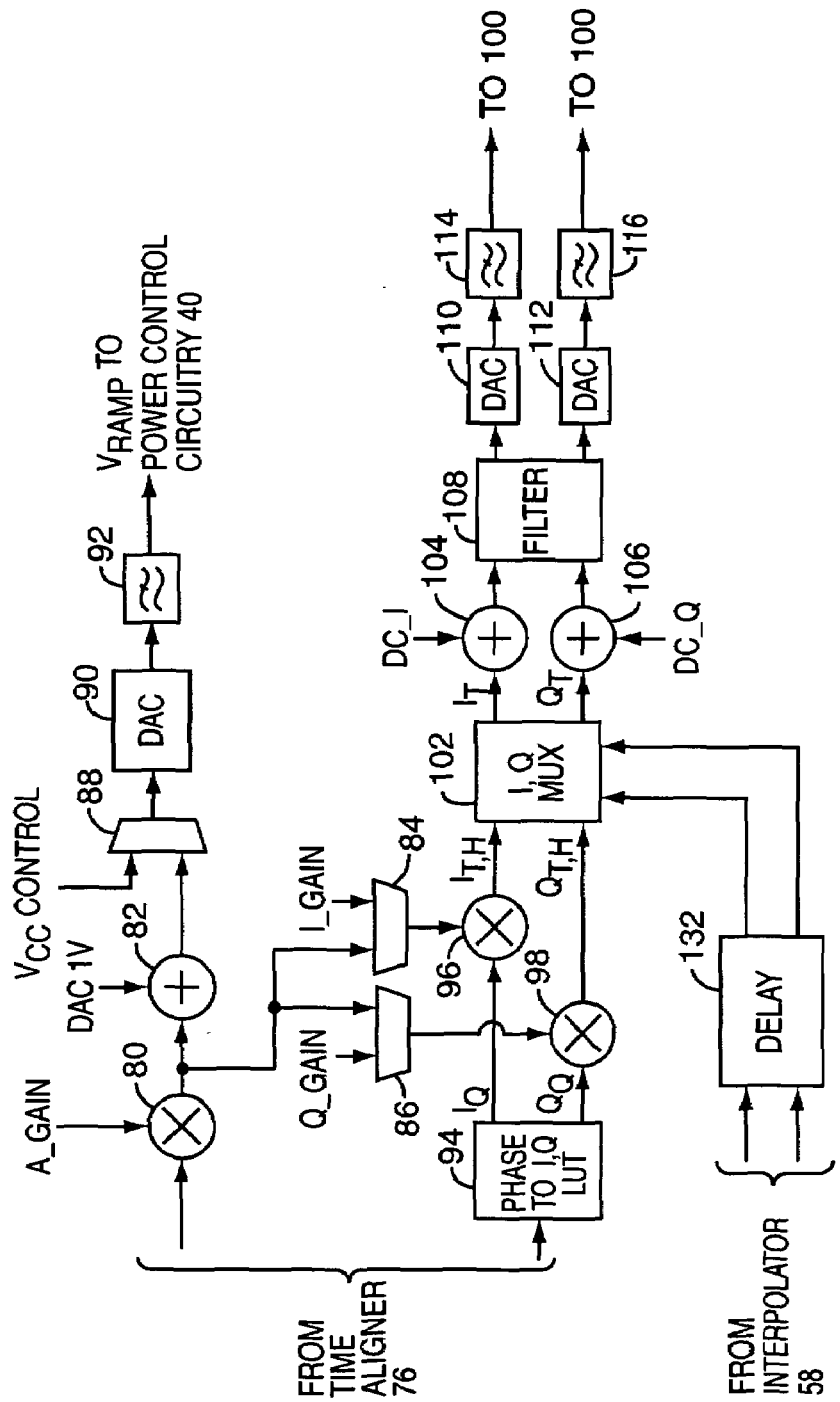
Figure 2C:
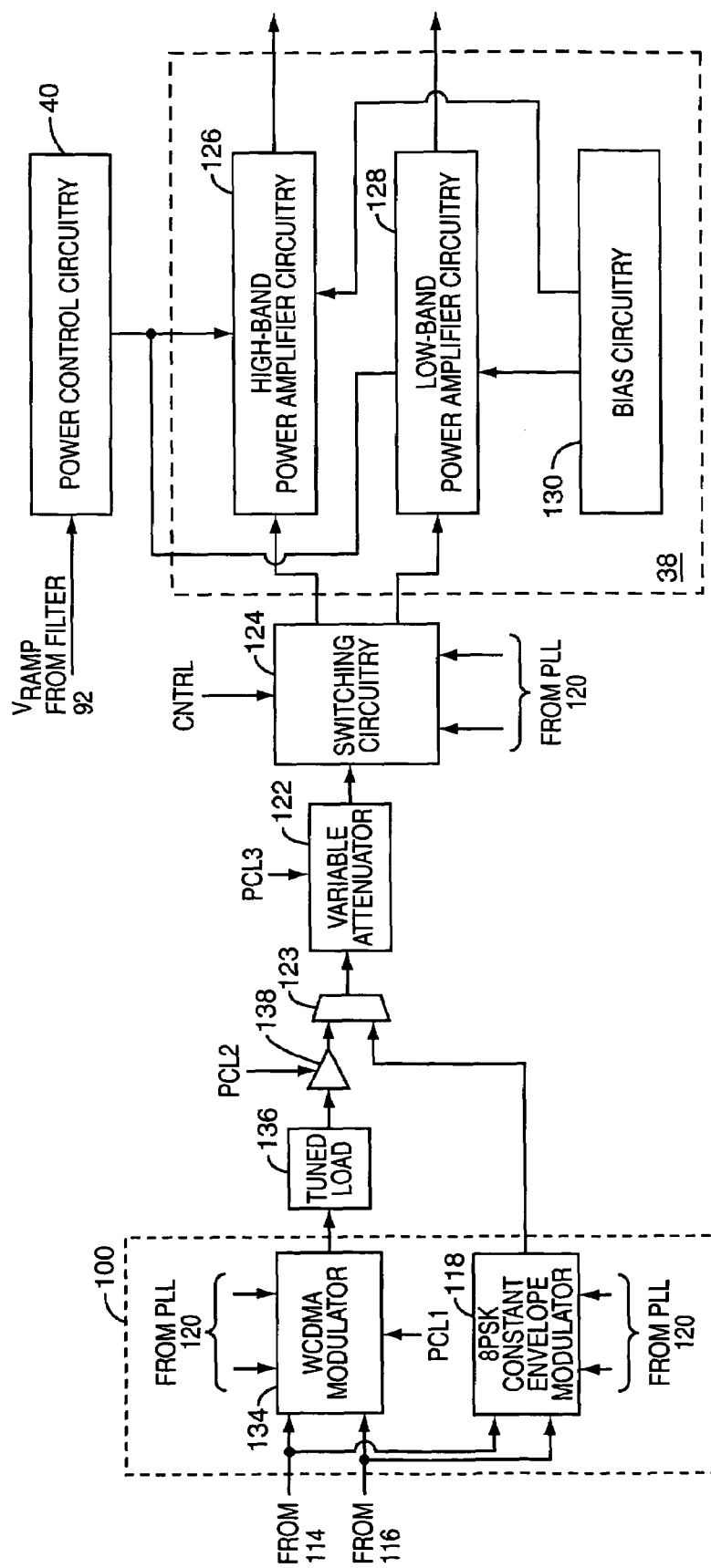

FIGS. 2A-2C illustrate a first exemplary embodiment of the radio frequency transmitter section 14 of FIG. 1 according to the present invention. The modulator 38, and thus the radio frequency transmitter section 14, provides multiband operation. More specifically, in the preferred embodiment, the modulator 38 operates in either an EDGE mode, a GMSK mode, or a WCDMA mode.

EDGE Mode

I. EDGE Mode

The operation of the radio frequency transmitter 14, and in particular the operation of the modulator 36, for EDGE mode is described. Referring to FIG. 2A, the modulator 36 includes a GSM data interface 52 that receives data to be transmitted from the baseband processor 20 (FIG. 1). The GSM data interface 52 may include First In First Out (FIFO) circuitry or may alternatively be a real time serial data interface.

When in EDGE mode, the GSM data interface 52 receives data from the baseband processor 20 at the bit rate of the system. This data is passed to mapping module 54, where the data is grouped into symbols of three consecutive data bits, Grey coded, and rotated by $3\pi/8$ on each symbol as per European Telecommunications Standards Institute (ETSI) specifications. The resulting symbol is mapped to one of sixteen points in an in-phase (I), quadrature phase (Q) constellation.

Both the in-phase (I) and the quadrature phase (Q) components for each point are then filtered by filtering circuitry 56. In an exemplary embodiment, the filtering circuitry 56 includes an EDGE finite impulse response (FIR) filter for each of the in-phase (I) and quadrature phase (Q) components. The filtering circuitry 56 shapes the response between symbol times as dictated by the ETSI specifications.

After filtering, both the in-phase (I) and the quadrature phase (Q) components are provided to a combined rate interpolator 58. In general, the combined rate interpolator 58 interpolates the in-phase (I) and the quadrature phase (Q) components in a fractional manner. A single crystal may be used to generate all clock signals in the modulator 36. As an example, the crystal may provide a 26 MHz clock signal. The clock used for digital-to-analog (D/A) conversion (DACs 110, 112 of FIG. 2B) may be, for example, 78 MHz, which is a multiple of 26 MHz. Both the 26 MHz frequency and the 78 MHz frequency are multiples of 270.8333 KHz, which is the symbol rate for EDGE mode or GMSK mode. However, for WCDMA mode, the chip rate is 3.84 MHz, which is not a multiple of 270.833 KHz, 26 MHz, or 78 MHz. So, when operating in WCDMA mode, the combined rate interpolator 58 operates to change the rate of the WCDMA in-phase (I) and quadrature phase (Q) signals from a multiple of 3.84 MHz to a multiple of 26 MHz. Further, it is desirable to interpolate the WCDMA in-phase (I) and quadrature phase (Q) signals from the multiple of 3.84 MHz to a higher clock rate to avoid aliasing, so the combined rate interpolator 58 performs this rate conversion in addition to the interpolation. For example, the combined rate interpolator 58 may receive the WCDMA in-phase (I) and quadrature phase (Q) signals at a rate of 7.68 MHz (2×3.84 MHz) and provide output in-phase (I) and quadrature phase (Q) samples at 39 MHz (78 Mhz divided by 2). Thus, it interpolates to 5.0781, which is a fractional number. It should be noted that the GSM signals, rather than the WCDMA signals, may alternatively be interpolated. As another alternative, separate crystal oscillators may be used to generate different clock signals for GSM operation and WCDMA operation such that an interpolation is not needed.

During EDGE mode, the combined rate interpolator 58 may simply pass the in-phase (I) and the quadrature phase (Q) components through to polar converter 60. The polar converter 60 uses a classical Coordinate Rotation Digital Computer (CORDIC) algorithm or like rectangular to polar conversion technique. Thus, the polar converter 60 generates phase ($\phi$) and amplitude (r) equivalent signals. Further information about CORDIC algorithms may be found in *Proceedings of the 1998 ACM/SIGDA Sixth International Symposium On Field Programmable Gate Arrays* by Ray Andraka, Feb. 22-24, pp. 191-200 and "The CORDIC Trigonometric Computing Technique" by Jack E. Volder *IRE Trans on Elect. Computers*, p. 330, 1959, both of which are hereby incorporated by reference in their entirety.

In EDGE mode, switching circuitry 62 is controlled such that the amplitude signal (r) from the polar converter 60 is provided at the output of the switching circuitry 62. The amplitude signal (r) provided by the switching circuitry 62 is combined with a ramping signal by multiplier 64. The ramping signal is provided by ramping circuitry 66, multiplier 68, and switching circuitry 70. In general, the ramping circuitry 66 generates a unity gain ramping signal that defines the ramp-up, ramp-down, and duration of each transmit burst as defined by the GSM standard. The unity gain ramping signal is combined with a power control setting (PCL0) by the multiplier 68 to provide the ramping signal. The power control setting (PCL0) may be provided by the control system 22 (FIG. 1) and controls the output power of the power amplifier circuitry 38 during EDGE mode. From the multiplier 68, the ramping signal is provided to the switching circuitry 70. The switching circuitry 70 is controlled such that the ramping signal is provided to the multiplier 64 and combined with the amplitude signal (r).

The output of the multiplier 64, which is hereafter referred to as a combined amplitude signal, is directed to Amplitude Modulation to Amplitude Modulation (AM/AM) compensation circuitry 72. The AM/AM compensation circuitry 72 introduces a compensation term to the combined amplitude signal that, after further processing, counteracts distortion introduced by AM/AM conversion in the power amplifier circuitry 38 (FIG. 2C). The AM/AM compensation circuitry 72 may predistort the combined amplitude signal using a predetermined set of polynomials or a look-up table. Further details of an exemplary embodiment of the AM/AM compensation circuitry 72 can be found in commonly owned and assigned U.S. Patent Application Publication No. 2003/0215026 entitled AM TO AM CORRECTION SYSTEM FOR POLAR MODULATOR, published Nov. 20, 2003, which is hereby incorporated by reference in its entirety.

The predistorted amplitude signal from the AM/AM compensation circuitry 72 is split and directed to Amplitude Modulation to Phase Modulation (AM/PM) compensation circuitry 74 and a time aligner 76. The AM/PM compensation circuitry 74 introduces a compensation term to the phase signal ($\phi$) via subtraction circuitry 78 that, after further processing, counteracts the distortion introduced by AM/PM conversion in the power amplifier circuitry 38 (FIG. 2C). Optionally, a constant phase term (PHASE JUMP) may be added at the subtraction circuitry 74, which may generally be referred to a combiner circuitry, in order to compensate for phase changes resulted from gain changes in the transmit path. The AM/PM compensation circuitry 74 may operate to provide the compensation term to the phase signal (φ) using a predetermined set of polynomials or a look-up table. Further details of an exemplary embodiment of the AM/PM compensation circuitry 74 can be found in commonly owned and assigned U.S. Patent Application Publication No. 2003/0215025 entitled AM TO PM CORRECTION SYSTEM FOR POLAR MODULATOR, published Nov. 20, 2003, which is hereby incorporated by reference in its entirety.

The output of the subtraction circuitry 78, which is referred to herein as a predistored phase signal, is directed to the time aligner 76. The time aligner 76 applies a relative time delay to the predistored amplitude signal and/or the predistored phase signal as necessary for best Error Vector Magnitude (EVM) and spectrum. It should be noted that the polar converter 60, switching circuitry 62, multiplier 64, switching circuitry 70, AM/AM compensation circuitry 72, AM/PM compensation circuitry 74, time aligner 76, and subtraction circuitry 78 are generally referred to herein as polar modulation circuitry 79.

At this point, the time aligned amplitude and phase signals (r, φ) from the time aligner 76 separate and proceed by different paths, an amplitude signal processing path and a phase signal processing path, to the power amplifier circuitry 38 (FIG. 2C). As illustrated in FIG. 2B, when in the EDGE mode, the amplitude signal (r) is provided to a multiplier 80. The multiplier 80 is optional and may be used to multiply the amplitude signal (r) by a gain setting (A_GAIN), which may be a fixed gain setting used to scale the amplitude signal (r) such that it is within an expected range. The output of the multiplier 80 is split and provided to combiner circuitry 82 and switching circuitries 84 and 86.

When operating in EDGE mode, the switching circuitries 84 and 86 are controlled to provide predetermined scaling factors (I_GAIN, Q_GAIN) rather than the scaled amplitude signal (r) from the multiplier 80. The combiner circuitry 82 is optional and may be used to apply a predetermined DC offset (DAC 1V) to the amplitude signal (r). The DC offset (DAC 1V) may be used to ensure that the power amplifier circuitry 38 (FIG. 2C) is providing a desired minimum output power level when the amplitude signal (r) is at a minimum value.

The amplitude signal (r) from the combiner circuitry 82 is then provided to switching circuitry 88. The switching circuitry 88 is controlled to provide the amplitude signal (r), rather than a control signal ($V_{CC}$ Control), at the output of the switching circuitry 88 when operating in EDGE mode. The output signal provided by the switching circuitry 88, which is hereafter referred to as a digital control signal, is converted to an analog signal by digital-to-analog converter (DAC) 90 and filtered by filtering circuitry 92 to provide the analog control signal ($V_{RAMP}$). The analog control signal ($V_{RAMP}$) is provided to the power control circuitry 40 (FIG. 2C) where it is used to set the supply voltage, which may also be referred to as a collector or drain voltage, provided to the power amplifier circuitry 38 (FIG. 2C). As the analog control signal ($V_{RAMP}$) changes, the supply voltage provided to the power amplifier circuitry 38 changes, and the output power will vary as $V^2/R_{out}$ ($R_{out}$ is not shown, but is effectively the load on the power amplifier circuitry 38).

The phase signal (φ) is directed from the time aligner 76 to phase-to-quadrature converter 94, where the phase signal (φ) is converted to a quadrature phase signal ($I_φ$, $Q_φ$). In the illustrated embodiment, the phase-to-quadrature converter 94 is a look-up table (LUT). The in-phase component ($I_φ$) and the quadrature phase component ($Q_φ$) are provided to multipliers 96 and 98, which are generally referred to as combiner circuitry. The multipliers 96 and 98 operate to combine the in-phase and quadrature phase components ($I_φ$, $Q_φ$) with the outputs of the switching circuitries 84 and 86, respectively. For the EDGE mode, the switching circuitries 84 and 86 are controlled to provide scaling factors I_GAIN and Q_GAIN, respectively. Ideally, I_GAIN and Q_GAIN are each "1". However, I_GAIN and Q_GAIN may be adjusted to compensate for any gain imbalance of quadrature modulator 100. The outputs of the multipliers 96 and 98, which are hereafter referred to as an in-phase component ($I_{T,H}$) and a quadrature phase component ($Q_{T,H}$) of a quadrature transmit signal, are provided to a multiplexer 102. As discussed below, the multiplexer 102 is optional and may be included when it is desired to have both a high-power EDGE mode and a low-power EDGE mode.

For EDGE mode, the multiplexer 102 is controlled to provide the quadrature transmit signal ($I_{T,H}$, $Q_{T,H}$) from the multipliers 96 and 98 as quadrature transmit signal ($I_T$, $Q_T$). Combiner circuitries 104 and 106 may optionally be included to compensate for any DC offset in the forward path. The quadrature transmit signal ($I_T$, $Q_T$) is then filtered by filtering circuitry 108, converted from digital to analog by DACs 110 and 112, and low-pass filtered by filters 114 and 116. The analog transmit signal ($I_T$, $Q_T$) is then provided to quadrature modulator 100. More specifically, in EDGE mode, the analog transmit signal ($I_T$, $Q_T$) is provided to a constant envelope modulator 118. The constant envelope modulator 118 upconverts and combines the in-phase and quadrature phase components of the analog transmit signal ($I_T$, $Q_T$) to provide a phase modulated signal at the desired radio frequency based on the output of a phase-locked loop 120 (FIG. 2C). Note, however, that the phase modulated signal has a constant envelope and therefore does not include an amplitude modulation component.

The phase modulated signal from the constant envelope modulator 118 is provided to a variable attenuator 122 via switching circuitry 123. The variable attenuator 122 may be controlled by a power control setting (PCL3) to provide power control in addition to the power control provided by the power control setting (PCL0). However, in one embodiment, the power control setting (PCL3) is constant during EDGE mode. Referring to FIG. 2C, the output of the variable attenuator 122 is provided to switching circuitry 124. During EDGE mode, the switching circuitry 124 is controlled to couple the output of the variable attenuator 122 to the input of the power amplifier circuitry 38. Further, the power amplifier circuitry 38 may include high-band power amplifier circuitry 126 and low-band power amplifier circuitry 128. In this case, the switching circuitry 124 may further be controlled to couple the variable attenuator 122 to either the high-band power amplifier circuitry 126 or the low-band power amplifier circuitry 128 depending on the band of operation. However, the power amplifier circuitry 38 may alternatively include a single power amplifier circuit capable of amplifying either high-band or low-band frequencies. As illustrated, the power amplifier circuitry 38 also includes bias circuitry 130. The bias circuitry 130 operates such that the power amplifier circuitry 38 operates in saturation when in EDGE mode.

The power control circuitry 40 operates to control the supply voltage provided to the power amplifier circuitry 38 based on the analog control signal ($V_{RAMP}$). The supply voltage may also be referred to as a collector or drain voltage. The power control circuitry 40 may be a linear drop-out (LDO) voltage regulator such as that described in commonly owned and assigned U.S. Pat. No. 6,701,138, entitled POWER AMPLIFIER CONTROL, issued Mar. 2, 2004, which is hereby incorporated by reference in its entirety. The power control circuitry 40 may alternatively be a switching power supply such as that described in commonly owned and assigned U.S. patent application Ser. No. 10/920,073, entitled POWER AMPLIFIER CONTROL USING A SWITCHING POWER SUPPLY, filed on Aug. 17, 2004, currently pending, which is hereby incorporated by reference in its entirety. Yet another alternative embodiment of the power control circuitry 40 may be configured as either an LDO or a switching power supply and is described in commonly owned and assigned U.S. patent application Ser. No. 11/002,473, entitled, RECONFIGURABLE POWER CONTROL FOR A MOBILE TERMINAL, filed on Dec. 2, 2004, currently pending, which is hereby incorporated by reference in its entirety.

It should be noted that the modulator 36 of the present invention provides an all digital path from the baseband processor 20 through the GSM data interface 52 to the DACs 110 and 112 in the phase path and to the DAC 90 in the amplitude path.

II. High-Power and Low-Power EDGE Modes

The radio frequency transmitter section 14 of FIGS. 2A-2C may optionally have a high-power EDGE mode and a low-power EDGE mode. In the high-power EDGE mode, the radio frequency transmitter section 14 and the modulator 36 in particular operate as described above. For low-power EDGE mode, the power amplifier circuitry 38 may be biased to operate linearly. Further, rather than operating according to a polar modulation scheme, a quadrature modulation scheme is used where the input to the power amplifier circuitry 38 is both amplitude and phase modulated.

More specifically, in low-power EDGE mode, the data is provided to the GSM data interface 52. The output of the data interface is mapped into the quadrature signal (I, Q) by the mapping module 54, and the quadrature signal (I, Q) is filtered by filtering circuitry 56. After filtering, the quadrature signal (I, Q) is processed by the combined rate interpolator 58.

The output of the combined rate interpolator 58 is coupled to both the polar converter 60 and delay circuitry 132. However, for the low-power EDGE mode, the desired forward path is through the delay circuitry 132 rather than through the polar converter 60. Thus, the polar converter 60 may be deactivated during this mode of operation. The delay circuitry 132 operates to delay the in-phase (I) and quadrature phase (Q) signals from the combined rate interpolator 58 such that they reach the multiplexer 102 at essentially the same time as if they had passed through the polar converter 60.

The multiplexer 102 is controlled such that the output of the delay circuitry 132 is provided to the DACs 110 and 112 via the multiplexer 102, combiner circuitries 104 and 106, and filtering circuitry 108. Unlike in the high-power EDGE mode, the analog quadrature transmit signal from the DACs 110 and 112 is provided to a linear quadrature modulator 134, which is also referred to herein as a WCDMA modulator. The modulator 134 operates to upconvert the analog quadrature signal from the DACs 110 and 112 using the output of the PLL 120 to provide an amplitude and phase modulated signal at the desired radio frequency.

The amplitude and phase modulated signal is provided to the power amplifier circuitry 38 via tuned load circuitry 136, amplifier 138, the variable attenuator 122, the switching circuitry 123, the variable attenuator 122, and the switching circuitry 124. As discussed below, the tuned load ensures that the gain of the quadrature modulator 100 is essentially constant for each of a number of desired frequency bands associated with the WCDMA mode. A gain of the amplifier 138 may be controlled by a power control setting (PCL2) to provide power control. However, in one embodiment, the power control setting (PCL2) is constant when operating in EDGE mode. The output of the amplifier 138 is provided to the variable attenuator 122 via the switching circuitry 123. Note the that switching circuitry 123 is controlled to provide either the output of the amplifier 138 or the output of the constant envelope modulator 118 to the variable attenuator 122 depending on the desired mode of operation. A resistance of the variable attenuator 122 is controlled by the power control setting (PCL3). In the preferred embodiment, the output power of the power amplifier circuitry 38 is controlled during low-power EDGE mode by controlling the resistance of the variable attenuator 122 via the power control setting (PCL3). By controlling the resistance of the variable attenuator 122, the magnitude of the modulated signal, and thus the output power of the power amplifier circuitry 38, is controlled. The output of the variable attenuator 122 is provided to the power amplifier circuitry 38 via the switching circuitry 124.

Now turning to the control signal ($V_{RAMP}$), the ramping signal from the ramping circuitry 66 and the multiplier 68 of FIG. 2A is provided to the multiplier 64 via the switching circuitry 70. The ramping signal is multiplied by the value "1" provided by the switching circuitry 62 for low-power EDGE mode. The ramping signal is optionally predistorted by the AM/AM compensation circuitry 72 and provided to the time aligner 76. The time aligner 76 operates to ensure that the ramping signal and the transmit signal arrive at the power amplifier circuitry 38 at essentially the same time. From the time aligner 76, the ramping signal is provided to the DAC 90 via multiplier 80, combiner circuitry 82, and the switching circuitry 88. The ramping signal is converted to an analog signal by the DAC 90 and filtered by the filtering circuitry 92 to provide the analog control signal ($V_{RAMP}$). Note that, unlike in the high-power EDGE mode, the analog control signal ($V_{RAMP}$) does not include an amplitude modulation component when operating in the low-power EDGE mode. Further, in the preferred embodiment, the power amplifier circuitry 38 is biased to operate linearly during low-power EDGE mode, and the magnitude of the analog control signal ($V_{RAMP}$) may be controlled by the power control setting (PCL0) to improve efficiency rather than to control output power.

GMSK Mode

The modulator 36 also includes a GMSK modulator, which includes GMSK modulation circuitry 140. When in GMSK mode, the data to be transmitted is provided from the GSM data interface 52 to the GMSK modulation circuitry 140. The GMSK modulation circuitry 140 processes the data to generate a frequency signal, which may also be referred to as a frequency deviation signal. In one embodiment, the GMSK modulation circuitry 140 is a look-up table. Another exemplary embodiment of the GMSK modulation circuitry 140 is discussed in U.S. Pat. No. 5,825,257 entitled GMSK MODULATOR FORMED OF PLL TO WHICH CONTINUOUS PHASE MODULATED SIGNAL IS APPLIED, issued Oct. 20, 1998, which is hereby incorporated by reference in its entirety. It should be appreciated that other embodiments of the GMSK modulation circuitry 140 may also be used and the particular circuitry is not central to the present invention.

The output of the GMSK modulation circuitry 140 is provided to an optional multiplier 142. The multiplier 142 operates to scale the frequency signal provided by the GMSK modulation circuitry 140 such that the frequency signal has the expected frequency deviation. The frequency signal from the multiplier 142 is provided to the PLL 120. Prior to entering the PLL the frequency signal may be filtered by a digital predistortion filter (not shown). Based on the frequency signal, the PLL 120 generates a phase modulated output signal at the desired radio frequency.

More specifically, the PLL 120 may include a fractional-N divider 144, a phase detector (PFD) 146, a charge pump 148, a low-pass filter 150, voltage controlled oscillators 152 and 154, and optionally dividers 156 and 158 arranged as shown. The operation of the PLL 120 will be apparent to one of ordinary skill in the art. In general, the frequency signal is provided to the input port of the fractional-N divider 144 such that the output signals of the VCOs 152 and 154 are phase modulated. The VCO 152 and divider 156 may provide frequencies in the 2 GHz range for high-band frequency operation, and the VCO 154 and divider 158 may provide frequencies in the 1 GHz range for low-band frequency operation.

The phase modulated signals from the VCOs 152 and 154 are provided to the switching circuitry 124. Depending on the desired frequency band, the switching circuitry 124 provides one of the phase modulated signals to the power amplifier circuitry 38. It should be noted, that the PLL 120 may alternatively have only one VCO capable of providing the phase modulated signal in any of the desired frequency bands. Further, the power amplifier circuitry 38 may include a single power amplifier chain capable of amplifying either the high-band frequencies or the low-band frequencies.

During GMSK mode, the power amplifier circuitry 38 is preferably biased to operate in saturation, and the output power of the power amplifier circuitry 38 is controlled by controlling the magnitude of the ramping signal via power control setting (PCL0). More specifically, the unity gain ramping signal is combined with the power control setting (PCL0) by the multiplier 68 to provide the ramping signal. The ramping signal from the multiplier 68 is provided to the multiplier 64 via the switching circuitry 70. The multiplier 64 operates to multiply the ramping signal by the value "1", which is provided by the switching circuitry 62 for GMSK mode. Since the multiplier 64 multiplies the ramping signal by the value "1" rather than an amplitude component (r) from the polar converter, the output of the multiplier 64 does not include an amplitude modulation component and is essentially equal to the ramping signal from the multiplier 68. The ramping signal is optionally predistorted by the AM/AM compensation circuitry 72 and provided to the time aligner 76. The time aligner 76 operates to ensure that the ramping signal and the phase modulated signal from the PLL 120 arrive at the power amplifier circuitry 38 at essentially the same time. From the time aligner 76, the ramping signal is provided to the DAC 90 via the multiplier 80, combiner circuitry 82, and switching circuitry 88. The ramping signal is converted to an analog signal by the DAC 90 and filtered by the filtering circuitry 92 to provide the analog control signal ($V_{RAMP}$). The analog control signal ($V_{RAMP}$) is provided to the power control circuitry 40 (FIG. 1, FIG. 2C).

WCDMA Mode

I. WCDMA Mode

Referring again to FIG. 2A, data interface 160 receives the data from the baseband processor 20 (FIG. 1). As discussed above, for the WCDMA mode, the baseband processor 20 maps data from the control system 22 (FIG. 1) into in-phase (I) and quadrature phase (Q) samples at a 1× chip rate, which is 3.84 MHz. The mapping is defined by the 3rd Generation Partnership Project (3GPP) specifications, as will apparent to one having ordinary skill in the art. In general, the data is mapped by creating several channels spread with different spreading codes. The channels are combined with various power gains to provide the in-phase (I) and quadrature phase (Q) samples.

The data interface 160 receives the in-phase (I) and quadrature phase (Q) samples from the baseband processor 20 and provides in-phase (I) and quadrature phase (Q) signals to filtering circuitry 162. The filtering circuitry 162 operates to provide pulse shaping according to the WCDMA standard and preferably includes a Finite Impulse Response (FIR) filter for each of the in-phase (I) and quadrature phase (Q) signals.

The filtered in-phase (I) and quadrature phase (Q) signals are provided to the combined rate interpolator 58. As discussed above, the combined rate interpolator 58 interpolates the in-phase (I) and the quadrature phase (Q) signals in a fractional manner. A single crystal may be used to generate all clock signals in the modulator 36. As an example, the crystal may provide a 26 MHz clock signal. The clock used for digital-to-analog (D/A) conversion (DACs 110, 112 of FIG. 2B) may be, for example, 78 MHz, which is a multiple of 26 MHz. Both the 26 MHz frequency and the 78 MHz frequency are multiples of 270.8333 KHz which is the symbol rate for EDGE mode or GMSK mode. However, for WCDMA mode, the chip rate is 3.84 MHz, which is not a multiple of 270.833 KHz, 26 MHz, or 78 MHz. So, when operating in WCDMA mode, the combined rate interpolator 58 operates to change the rate of the WCDMA in-phase (I) and quadrature phase (Q) signals from a multiple of 3.84 MHz to a multiple of 26 MHz. Further, it is desirable to interpolate the WCDMA in-phase (I) and quadrature phase (Q) signals from the multiple of 3.84 MHz to a higher clock rate to avoid aliasing, so the combined rate interpolator 58 performs this rate conversion in addition to the interpolation.

The combined rate interpolator 58 provides the in-phase (I) and the quadrature phase (Q) signals to the polar converter 60. The polar converter 60 generates phase ($\phi$) and amplitude (r) equivalent signals. In WCDMA mode, switching circuitry 62 is controlled such that the amplitude signal (r) from the polar converter 60 is provided at the output of the switching circuitry 62. The amplitude signal (r) provided by the switching circuitry 62 is combined with a value of "1" by multiplier 64. More specifically, in WCDMA mode, the switching circuitry 70 is controlled such that the value of "1" is provided to the multiplier 64 rather than the ramping signal.

The output of the multiplier 64, which is hereafter referred to as a combined amplitude signal, is directed to the AM/AM compensation circuitry 72. The AM/AM compensation circuitry 72 introduces a compensation term to the combined amplitude signal that, after further processing, counteracts distortion introduced by AM/AM conversion in the power amplifier circuitry 38 (FIG. 2C). The predistorted amplitude signal from the AM/AM compensation circuitry 72 is split and directed to the AM/PM compensation circuitry 74 and the time aligner 76. The AM/PM compensation circuitry 74 introduces a compensation term to the phase signal ($\phi$) via the subtraction circuitry 78 that, after further processing, counteracts the distortion introduced by AM/PM conversion in the power amplifier circuitry 38 (FIG. 2C). By using the AM/AM compensation circuitry 72 and the AM/PM compensation circuitry 74 for WCDMA mode, the power amplifier circuitry 38 may be operated in the linear mode at a point near compression, which is unlike a typical power amplifier in a WCDMA system. By operating at a point near compression, the efficiency of the power amplifier circuitry 38 is improved.

The predistorted phase signal from the output of the subtraction circuitry 78 is directed to the time aligner 76. The time aligner 76 applies a relative time delay to the predistored amplitude signal and/or the predistored phase signal as necessary for best Error Vector Magnitude (EVM) and spectrum.

At this point, the time aligned amplitude and phase signals (r, φ) from the time aligner 76 separate and proceed by different paths, an amplitude signal processing path and a phase signal processing path, to the power amplifier circuitry 38. As illustrated in FIG. 2B, when in the WCDMA mode, the amplitude signal (r) from the time aligner 76 is provided to the multiplier 80. The multiplier 80 is optional and may be used to multiply the amplitude signal (r) by a gain setting (A_GAIN), which may be a fixed gain setting used to scale the amplitude signal (r) such that it is within an expected range. The output of the multiplier 80 is split and provided to combiner circuitry 82 and switching circuitries 84 and 86. When operating in WCDMA mode, the switching circuitries 84 and 86 are controlled to provide the amplitude signal from the multiplier 80, rather than the scaling factors (I_GAIN, Q_GAIN), to the multipliers 96 and 98.

The phase signal (φ) is directed from the time aligner 76 to the phase-to-quadrature converter 94, where the phase signal (φ) is converted to a quadrature phase signal ($I_φ$, $Q_φ$). In the illustrated embodiment, the phase-to-quadrature converter 94 is a look-up table (LUT). The in-phase component ($I_φ$) and the quadrature phase component ($Q_φ$) are provided to multipliers 96 and 98, which are generally referred to as combiner circuitry. The multipliers 96 and 98 operate to combine the in-phase and quadrature phase components of the quadrature phase signal ($I_φ$, $Q_φ$) with the outputs of the switching circuitries 84 and 86, respectively. As stated above, for the WCDMA mode, the switching circuitries 84 and 86 are controlled to provide the amplitude signal from the multiplier 80. As a result, the amplitude and phase paths are recombined, and the multipliers 96 and 98 provide an in-phase component ($I_{T,H}$) and a quadrature phase component ($Q_{T,H}$) of a quadrature transmit signal having both amplitude and phase modulation components. The in-phase component ($I_{T,H}$) and the quadrature phase component ($Q_{T,H}$) are provided to the multiplexer 102. The multiplexer 102 is optional and may be included when it is desired to have both a high-power WCDMA mode and a low-power WCDMA mode.

The multiplexer 102 provides quadrature transmit signal ($I_T$, $Q_T$), where the quadrature transmit signal ($I_T$, $Q_T$) is the quadrature transmit signal ($I_{T,H}$, $Q_{T,H}$) from the multipliers 96 and 98 during WCDMA mode. The combiner circuitries 104 and 106 may optionally be included to compensate for any DC offset in the forward path. The quadrature transmit signal ($I_T$, $Q_T$) is then filtered by filtering circuitry 108, converted from digital to analog by the DACs 110 and 112, and low-pass filtered by the filters 114 and 116. The analog transmit signal ($I_T$, $Q_T$) is then provided to the quadrature modulator 100. More specifically, in WCDMA mode, the analog transmit signal ($I_T$, $Q_T$) is provided to the linear quadrature modulator 134, which is also referred to as a WCDMA modulator. The linear quadrature modulator 134 operates to upconvert the analog quadrature signal from the DACs 110 and 112 based on the output of the PLL 120 to provide an amplitude and phase modulated signal at the desired radio frequency. The amplitude and phase modulated signal is provided to the power amplifier circuitry 38 via tuned load circuitry 136, amplifier 138, the variable attenuator 122, and the switching circuitry 124.

The tuned load circuitry 136 operates such that the gain of the linear quadrature modulator 134 is constant over a large frequency range. More specifically, the WCDMA includes five different frequency bands, R1-R5. The tuned load circuitry 136 allows a single modulator, the linear quadrature modulator 134, to be used for all five frequency bands by keeping the gain of the linear quadrature modulator 134 constant over the entire frequency range.

The amplifier 138 and the variable attenuator 122 provide output power control under the control of power control settings PCL2 and PCL3. In addition, the gain of the linear quadrature modulator 134 may be controlled by power control setting PCL1. In WCDMA mode, the output power of the radio frequency transmitter section 14 must be controlled over an 80 dB range. By using the power control settings PCL1, PCL2, and PCL3, the desired output power control can be achieved. More specifically, the power amplifier circuitry 38 is biased to operate linearly, and the power control settings PCL1-PCL3 control a magnitude of the modulated signal provided to the power amplifier circuitry 38 and thereby control the output power of the power amplifier circuitry 38.

The output of the variable attenuator 122 is provided to the switching circuitry 124. During WCDMA mode, the switching circuitry 124 is controlled to couple the output of the variable attenuator 122 to the input of the power amplifier circuitry 38. Further, the power amplifier circuitry 38 may include the high-band power amplifier circuitry 126 and the low-band power amplifier circuitry 128. In this case, the switching circuitry 124 may further be controlled to couple the variable attenuator 122 to either the high-band power amplifier circuitry 126 or the low-band power amplifier circuitry 128 depending on the band of operation. However, the power amplifier circuitry 38 may alternatively include a single power amplifier circuit capable of amplifying either high-band or low-band frequencies. As illustrated, the power amplifier circuitry 38 also includes the bias circuitry 130. The bias circuitry 130 operates such that the power amplifier circuitry 38 operates linearly during WCDMA mode. Preferably, the power amplifier circuitry 38 is biased to operate linearly at a point near compression when in WCDMA mode in order to provide improved efficiency.

Now turning to the control signal ($V_{RAMP}$) used to control the power control circuitry 40. For the WCDMA mode, the switching circuitry 88 provides the control signal ($V_{CC}$ Control) rather than the amplitude signal from the multiplier 80 to the DAC 90. The control signal ($V_{CC}$ Control) may be provided by the control system 22 such that the supply voltage of the power amplifier circuitry 38 is set to a desired level. For example, the control signal ($V_{CC}$ Control) may be reduced as the output power level is reduced in order to improve the efficiency of the power amplifier circuitry 38. The control signal ($V_{CC}$ Control) from the switching circuitry 88 is converted to an analog signal by the DAC 90 and filtered by the filtering circuitry 92 to provide the analog control signal ($V_{RAMP}$). The analog control signal ($V_{RAMP}$) is provided to the power control circuitry 40 (FIG. 2C) where it is used to set the supply voltage, which may also be referred to as a collector or drain voltage, of the power amplifier circuitry 38 (FIG. 2C).

II. High-Power and Low-Power WCDMA Modes

The radio frequency transmitter section 14 of FIGS. 2A-2C may optionally have a high-power WCDMA mode and a low-power WCDMA mode. In the high-power WCDMA mode, the radio frequency transmitter section 14 and the modulator 36 in particular operate as described above. For low-power WCDMA mode, the power amplifier circuitry 38 is operating linearly and is no longer near compression. As such, the AM/AM and AM/PM compensation circuitries 72 and 74 are no longer needed. Thus, the delay circuitry 132 allows the polar converter 60, the AM/AM and AM/PM compensation circuitries 72 and 74, the time aligner 76, the phaseto-quadrature converter 94, and the multipliers 96 and 98 to be by-passed and optionally deactivated in order to save current and improve the efficiency of the radio frequency transmitter section 14.

More specifically, in low-power WCDMA mode, the data is provided to the data interface 160. The quadrature signals (I, Q) provided by the data interface 160 are filtered by filtering circuitry 162. After filtering, the quadrature signals (I, Q) are processed by the combined rate interpolator 58, as described above.

The output of the combined rate interpolator 58 is coupled to both the polar converter 60 and delay circuitry 132. However, for the low-power WCDMA mode, the desired forward path is through the delay circuitry 132 rather than through the polar converter 60. Thus, the polar modulation circuitry 79 and any other circuitry not used during the low-power WCDMA mode may be deactivated during this mode of operation. The delay circuitry 132 operates to delay the in-phase (I) and quadrature phase (Q) signals from the combined rate interpolator 58 such that they reach the multiplexer 102 at essentially the same time as if they had passed through the polar converter 60.

The output of the delay circuitry 132 is provided to the DACs 110 and 112 via the multiplexer 102, combiner circuitries 104 and 106, and filtering circuitry 108. The analog quadrature transmit signal from the DACs 110 and 112 is provided to the linear quadrature modulator 134, which is also referred to herein as a WCDMA modulator. The linear quadrature modulator 134 operates to upconvert the analog quadrature signal from the DACs 110 and 112 using the output of the PLL 120 to provide an amplitude and phase modulated signal at the desired radio frequency. The amplitude and phase modulated signal is provided to the power amplifier circuitry 38 via tune load circuitry 136, amplifier 138, the variable attenuator 122, and the switching circuitry 124. As discussed above, the power control settings PCL1-PCL3 may be used for power control.

For the WCDMA mode, the control signal ($V_{RAMP}$) may be controlled to improve the efficiency of the power amplifier circuitry 38. Unlike in the EDGE and GMSK modes, the switching circuitry 88 provides the control signal ($V_{CC}$ Control), rather than the output of the multiplier 80, to the DAC 90. The control signal ($V_{CC}$ Control) may be provided by the control system 22 such that the supply voltage of the power amplifier circuitry 38 is set to a desired level. The control signal ($V_{CC}$ Control) is controlled as a function of the target output power of the power amplifier circuitry 38 and/or the envelope of the modulated signal via extracting parameters such as Peak-to-Average Ratio or Cubic Metric of the modulated signal. For example, the control signal ($V_{CC}$ Control) may be provided such that the supply voltage provided to the power amplifier circuitry 38 is reduced as the output power level is reduced in order to improve the efficiency of the power amplifier circuitry 38. The control signal ($V_{CC}$ Control) from the switching circuitry 88 is converted to an analog signal by the DAC 90 and filtered by the filtering circuitry 92 to provide the analog control signal ($V_{RAMP}$). The analog control signal ($V_{RAMP}$) is provided to the power control circuitry 40 (FIG. 2C) where it is used to set the supply voltage, which may also be referred to as a collector or drain voltage, of the power amplifier circuitry 38 (FIG. 2C).

OTHER EMBODIMENTS

Figure 3A:
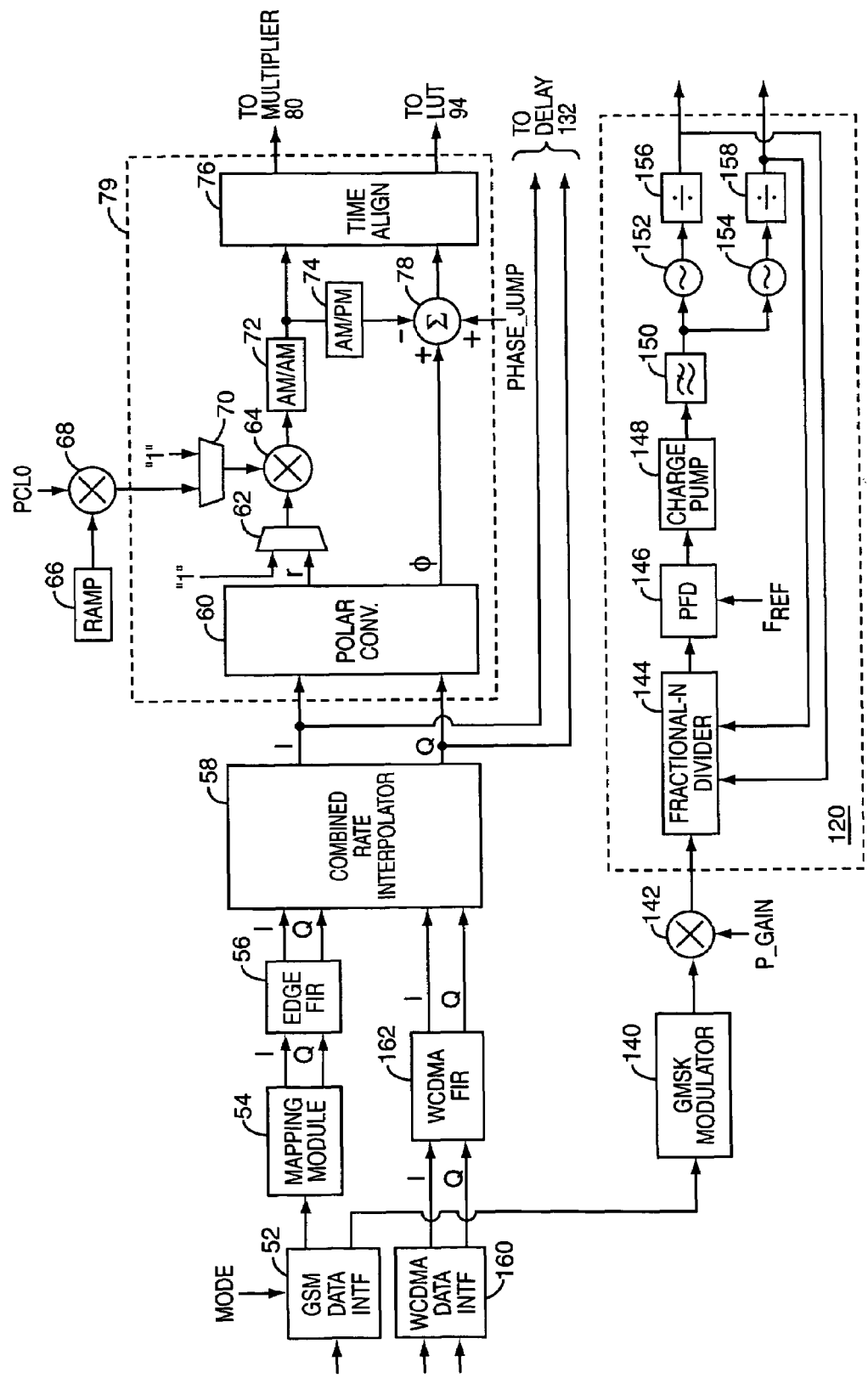
FIGS. 3A-3C illustrate a multimode modulator according to a second embodiment of the present invention.
Figure 3B:
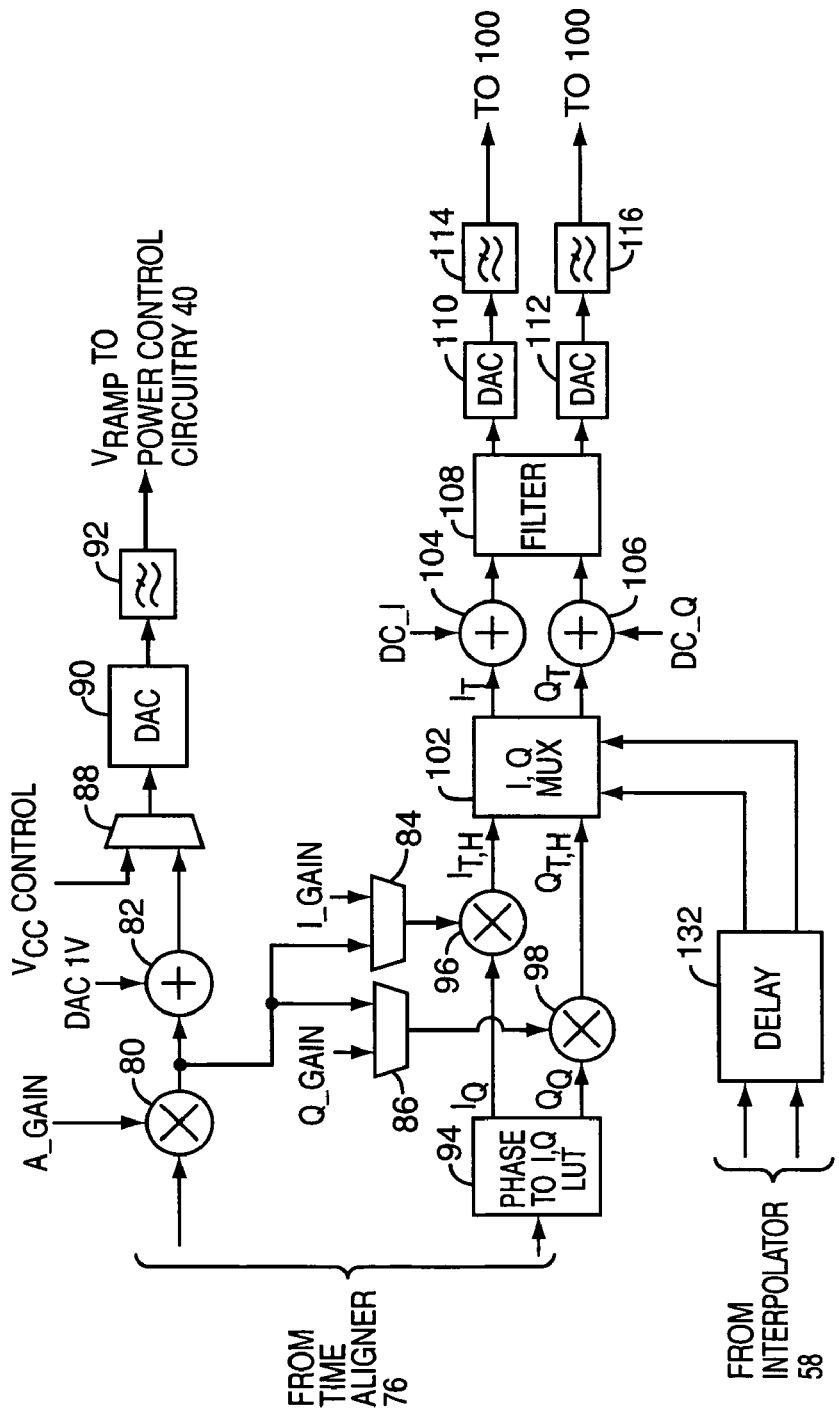
Figure 3C:
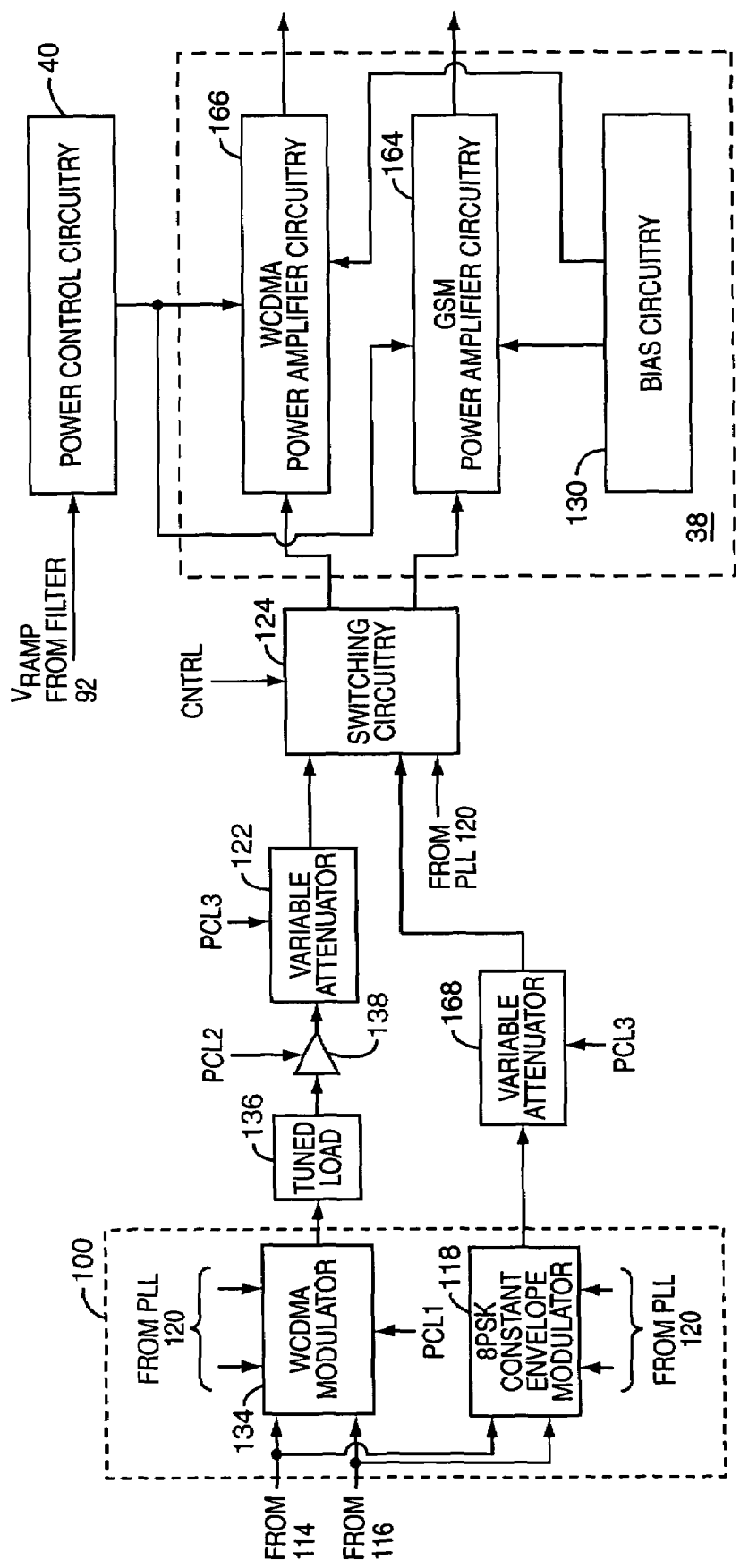

FIGS. 3A-3C are substantially the same as FIGS. 2A-2C and illustrate a second exemplary embodiment of the present invention. However, referring to FIG. 3C, the power amplifier circuitry 38 includes separate power amplifiers for GSM operation and WCDMA operation. More specifically, the power amplifier circuitry 38 includes GSM power amplifier circuitry 164 and WCDMA power amplifier circuitry 166. The GSM power amplifier circuitry 164 may include high-band and low-band GSM power amplifier circuitry and operates to amplify the output of the modulator 36 during either EDGE mode or GMSK mode. The WCDMA power amplifier circuitry 166 may also include high-band and low-band WCDMA power amplifier circuitry and operates to amplify the output of the modulator 36 during WCDMA mode.

The switching circuitry 124 is controlled to provide the output of variable attenuator 168 (FIG. 3B) to the input of the GSM power amplifier circuitry 164 for EDGE mode. The variable attenuator 168 is optional and may be controlled by the power control setting (PCL3) to provide power control in addition to or as an alternative to the power control setting (PCL0). In the embodiment where there is a high-power EDGE mode and a low-power EDGE mode, the switching circuitry 124 couples the output of the variable attenuator 168 to the input of the GSM power amplifier circuitry 164 for the high-power EDGE mode. For low-power EDGE mode, the transmit signal is directed through the linear quadrature modulator 134, tuned load circuitry 136, amplifier 138, and variable attenuator 122, and the switching circuitry 124 is controlled to provide the output of the variable attenuator 122 to the input of the GSM power amplifier circuitry 164. For GMSK mode, the switching circuitry 124 is controlled to provide the output of the PLL 120 to the input of the GSM power amplifier circuitry 164.

For WCDMA mode, the switching circuitry 124 is controlled to provide the output of the variable attenuator 122 to the input of the WCDMA power amplifier circuitry 166. If there is both a high-power WCDMA mode and a low-power WCDMA mode, the switching circuitry 124 operates the same for both modes to provide the output of the variable attenuator 122 to the input of the WCDMA power amplifier circuitry 166.

Figure 4A:
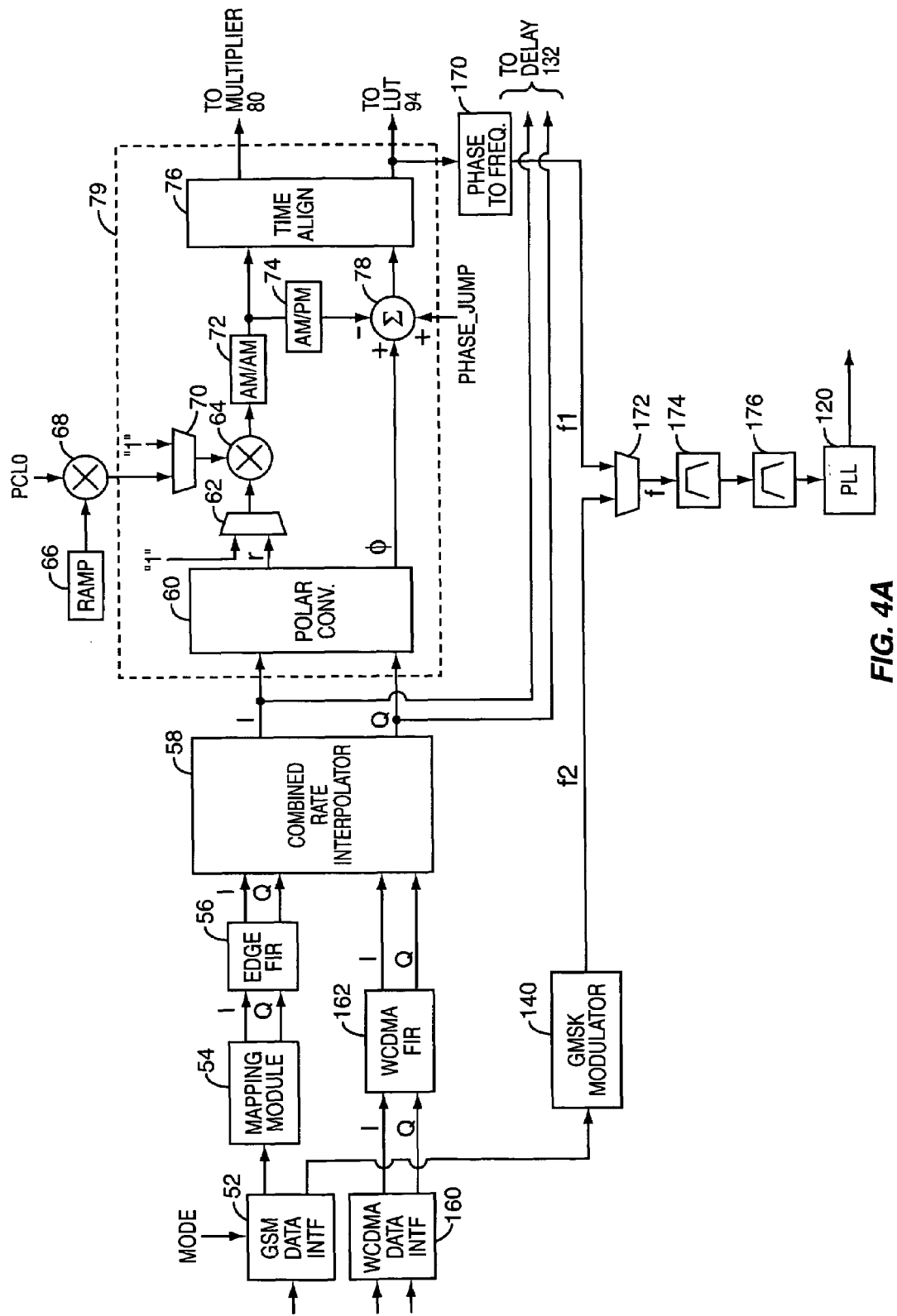
FIGS. 4A-4C illustrate a multimode modulator according a third embodiment of the present invention.
Figure 4B:
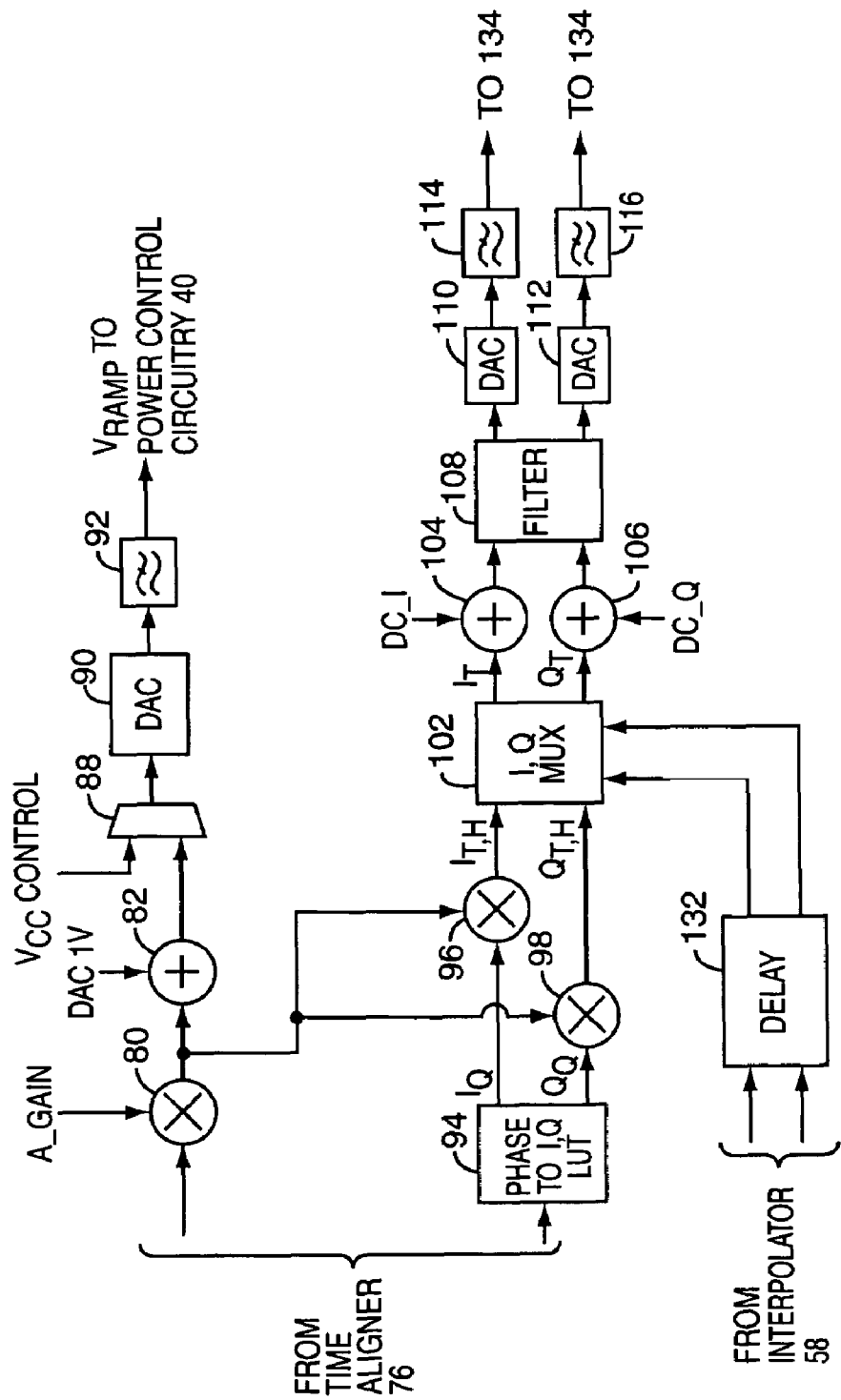
Figure 4C:
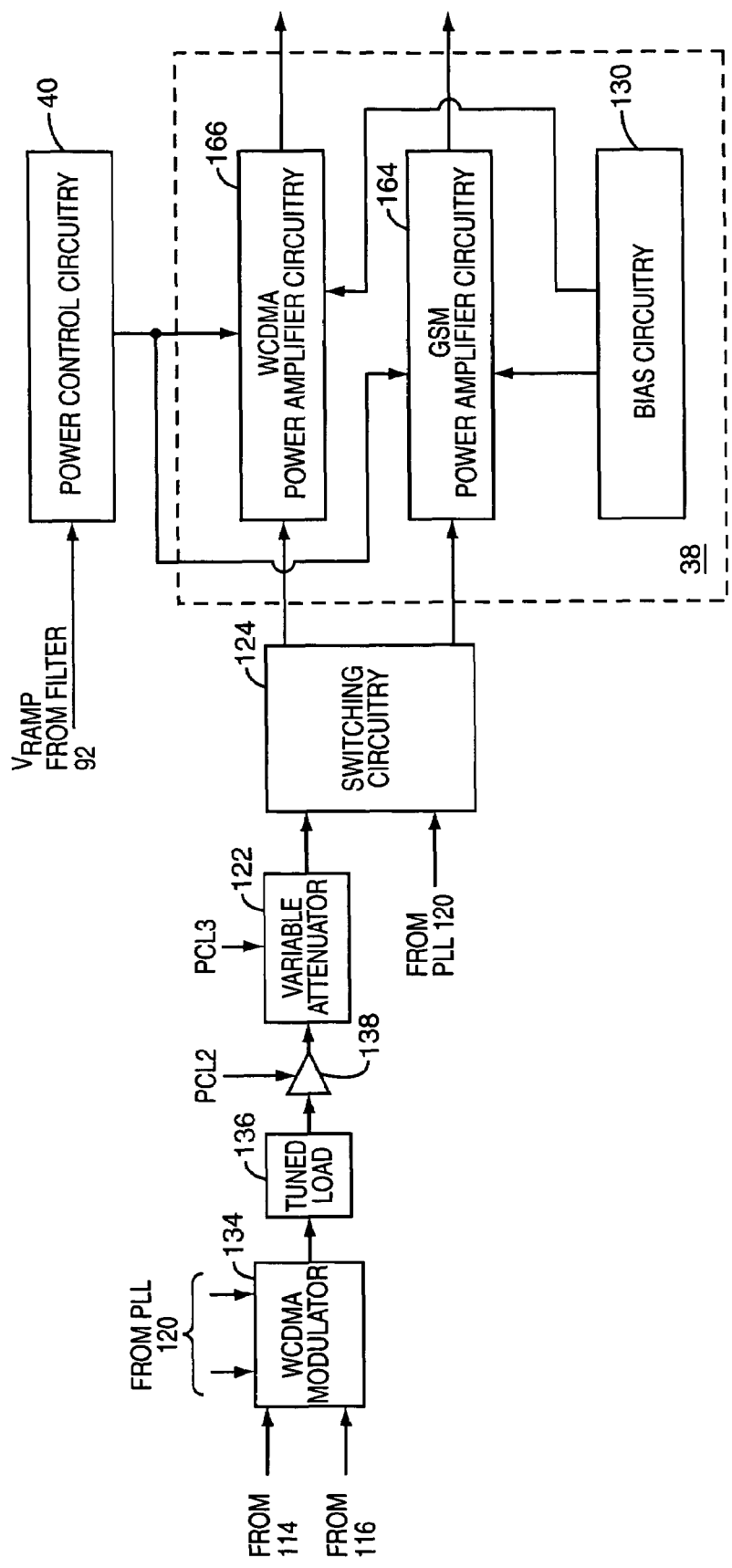

FIGS. 4A-4C are substantially the same as FIGS. 2A-2C and illustrate a third exemplary embodiment of the present invention. However, in this embodiment, the PLL 120 is used for the GSMK mode, as discussed above, and for the EDGE mode, as described in commonly owned and assigned U.S. Pat. No. 6,834,084, entitled DIRECT DIGITAL POLAR MODULATOR, issued Dec. 21, 2004, which is hereby incorporated by reference in its entirety. The operation of the radio frequency transmitter section 14 including the modulator 36 is substantially the same as described above for the WCDMA mode.

More specifically, for EDGE mode, or optionally high-power EDGE mode, the data from the baseband processor 20 (FIG. 1) is provided by the data interface 52 and processed by the mapping module 54, filtering circuitry 56, combined rate interpolator 58, and polar converter 60 to provide the amplitude and phase components (r, φ), as described above. The amplitude component (r) is combined with a ramping signal by the multiplier 64 and predistored by the AM/AM compensation circuitry 72. The phase signal (φ) is predistored by the AM/PM compensation circuitry 74. The predistorted amplitude and phase signals are time aligned by the time aligner 76. The amplitude signal (r) from the time aligner 76 is processed as described above to provide the analog control signal ($V_{RAMP}$) having an amplitude modulation component. The phase signal (φ) from the time aligner 76 is converted to a frequency deviation signal (f1) by phase-to-frequency converter 170 and provided to switching circuitry 172.

The switching circuitry 172 is controlled to provide the frequency deviation signal (f1) as frequency deviation signal (f) for EDGE mode. The frequency deviation signal (f) is digitally low pass filtered by digital filter 174 and then predistorted by digital predistortion filter 176 before being provided to the PLL 120. As discussed above, the frequency deviation signal (f) may be provided to the fractional-N divider 144 (FIG. 2A) in the PLL 120 such that the output of the PLL 122 is phase modulated.

For GMSK mode, the switching circuitry 172 is controlled to provide a frequency deviation signal (f2) from the GMSK modulator 140 to the PLL 120, as described above. For WCDMA mode, the modulator 36 operates as described above.

It should be noted that switching circuitries 84 and 86 (FIGS. 2B and 3B) are not needed in this embodiment because the desired transmit path for EDGE mode no longer passes through the phase-to-quadrature converter 94. In addition, for an embodiment where there is no low-power EDGE mode, the switching circuitry 124 (FIGS. 2C and 3C) may no longer be needed because the input for the GSM amplifier circuitry 164 is provided by the PLL 120 for both EDGE mode and GMSK mode and the input for the WCDMA power amplifier circuitry 166 is provided by the variable attenuator 122. For either EDGE mode or GMSK mode, the GSM power amplifier circuitry 164 is enabled, and the WCDMA power amplifier circuitry 166 is disabled. For WCDMA mode, the WCDMA power amplifier circuitry 166 is enabled, and the GSM power amplifier circuitry 164 is disabled.

Those skilled in the art will recognize improvements and modifications to the preferred embodiments of the present invention. All such improvements and modifications are considered within the scope of the concepts disclosed herein and the claims that follow.

What is claimed is:

1. A modulator for a multimode transmitter comprising:
   a) polar modulation circuitry adapted to:
      i) convert a quadrature input signal into amplitude and phase components; and
      ii) predistort the amplitude component and the phase component to provide predistorted amplitude and phase components;
   b) phase-to-quadrature conversion circuitry adapted to convert the predistorted phase component into a quadrature phase signal;
   c) combiner circuitry adapted to combine the quadrature phase signal and the predistorted amplitude component to provide a quadrature transmit signal for a first mode of operation; and
   d) further modulation circuitry adapted to:
      i) modulate the quadrature transmit signal when operating in the first mode of operation to provide a modulated signal at a desired radio frequency for the first mode of operation; and
      ii) modulate either the predistorted phase component or the quadrature phase signal when operating in a second mode of operation to provide a constant envelope phase modulated signal at a desired radio frequency for the second mode of operation.

2. The modulator of claim 1 wherein the predistorted amplitude component controls a supply voltage provided to power amplifier circuitry amplifying the constant envelope phase modulated signal to provide amplitude modulation when operating in the second mode of operation.

3. The modulator of claim 2 wherein either the amplitude component or the predistorted amplitude component is scaled based on a power control setting such that the predistorted amplitude component further controls the supply voltage provided to the power amplifier circuitry to control an output power level of the power amplifier circuitry for the second mode of operation.

4. The modulator of claim 1 wherein the first mode of operation is a Wideband Code Division Multiple Access (WCDMA) mode.

5. The modulator of claim 1 wherein the second mode of operation is an Enhanced Data Rate for Global Evolution (EDGE) mode.

6. The modulator of claim 1 wherein the further modulation circuitry comprises a quadrature modulator adapted to:
   modulate the quadrature transmit signal when operating in the first mode of operation to provide the modulated signal for the first mode of operation; and
   modulate the quadrature phase signal when operating in the second mode of operation to provide the constant envelope phase modulated signal for the second mode of operation.

7. The modulator of claim 6 wherein the quadrature modulator comprises:
   linear modulation circuitry adapted to modulate the quadrature transmit signal when operating in the first mode of operation to provide the modulated signal for the first mode of operation; and
   constant envelope modulation circuitry adapted to modulate the quadrature phase signal when operating in the second mode of operation to provide the constant envelope phase modulated signal for the second mode of operation.

8. The modulator of claim 7 wherein the modulator is further adapted to operate in a low-power mode for the first mode of operation, the modulator further comprising:
   delay circuitry adapted to delay the quadrature input signal to provide a quadrature output signal;
   wherein for the low-power mode for the first mode of operation, the linear modulation circuitry modulates the quadrature output signal rather than the quadrature transmit signal to provide the modulated signal for the first mode of operation.

9. The modulator of claim 8 wherein the modulator is further adapted to operate in a low-power mode for the second mode of operation;
   wherein for the low-power mode for the second mode of operation, the linear modulation circuitry modulates the quadrature output signal rather than the quadrature transmit signal to provide the modulated signal for the second mode of operation.

10. The modulator of claim 9 wherein the polar modulation circuitry is disabled when operating in the low-power mode for either the first or second mode of operation.

11. The modulator of claim 6 further comprising:
    Gaussian Minimum Shift Keying (GMSK) modulation circuitry adapted to provide a frequency deviation signal based on input data; and
    phase-locked loop circuitry adapted to provide a phase modulated signal at a desired radio frequency for a GMSK mode of operation based on the frequency deviation signal.

12. The modulator of claim 1 wherein the further modulation circuitry comprises:
    a quadrature modulator adapted to modulate the quadrature transmit signal when operating in the first mode of operation to provide the modulated signal for the first mode of operation; and phase-locked loop circuitry adapted to provide the constant envelope phase modulated signal when operating in the second mode of operation based on the predistorted phase component.

13. The modulator of claim 12 further comprising Gaussian Minimum Shift Keying (GMSK) modulation circuitry adapted to provide a frequency deviation signal based on input data, wherein the phase-locked loop circuitry is further adapted to provide a phase modulated signal at a desired radio frequency based on the frequency deviation signal when operating in a GMSK mode of operation.

14. The modulator of claim 1 wherein the polar modulation circuitry comprises:
  polar conversion circuitry adapted to convert the quadrature input signal into the amplitude and phase components; and
  compensation circuitry adapted to predistort the amplitude and phase components to provide the predistorted amplitude and phase components.

15. The modulator of claim 14 wherein the compensation circuitry comprises Amplitude Modulation to Amplitude Modulation (AM/AM) compensation circuitry adapted to predistort the amplitude component to provide the predistorted amplitude component.

16. The modulator of claim 14 wherein the compensation circuitry comprises Amplitude Modulation to Phase Modulation (AM/PM) compensation circuitry adapted to predistort the phase component to provide the predistorted phase component.

17. The modulator of claim 14 wherein the polar modulation circuitry further comprises a time aligner adapted to time align the predistorted amplitude and phase components.

18. The modulator of claim 1 wherein the modulator is further adapted to control a magnitude of the modulated signal for the first mode of operation based on at least one control signal, wherein the modulated signal for the first mode of operation is provided to power amplifier circuitry and the magnitude of the modulated signal for the first mode of operation controls an output power level of the power amplifier circuitry.

19. A method of modulating a transmit signal in a multimode transmitter comprising:
  converting a quadrature input signal into amplitude and phase components;
  predistorting the amplitude component and the phase component to provide predistorted amplitude and phase components;
  converting the predistorted phase component into a quadrature phase signal;
  combining the quadrature phase signal and the predistorted amplitude component to provide a quadrature transmit signal for a first mode of operation;
  modulating the quadrature transmit signal when operating in the first mode of operation to provide a modulated signal at a desired radio frequency for the first mode of operation; and
  modulating either the predistorted phase component or the quadrature phase signal when operating in a second mode of operation to provide a constant envelope phase modulated signal at a desired radio frequency for the second mode of operation.

20. The method of claim 19 further comprising controlling a supply voltage provided to power amplifier circuitry amplifying the constant envelope phase modulated signal based on the predistorted amplitude component to provide amplitude modulation when operating in the second mode of operation.

21. A modulator for a multimode transmitter comprising:
  a) polar modulation circuitry adapted to:
    i) convert a quadrature input signal into amplitude and phase components; and
    ii) predistort at least one of the amplitude component and the phase component to provide output amplitude and phase components;
  b) phase-to-quadrature conversion circuitry adapted to convert the output phase component into a quadrature phase signal;
  c) combiner circuitry adapted to combine the quadrature phase signal and the output amplitude component to provide a quadrature transmit signal for a first mode of operation; and
  d) further modulation circuitry adapted to:
    i) modulate the quadrature transmit signal when operating in the first mode of operation to provide a modulated signal at a desired radio frequency for the first mode of operation; and
    ii) modulate either the output phase component or the quadrature phase signal when operating in a second mode of operation to provide a constant envelope phase modulated signal at a desired radio frequency for the second mode of operation.

* * * * *